(12) United States Patent
Berger et al.

(10) Patent No.: US 9,864,516 B2
(45) Date of Patent: Jan. 9, 2018

(54) UNIVERSAL KEYBOARD

(71) Applicants: Jordan A. Berger, Armonk, NY (US); John V. Monaco, Yorktown Heights, NY (US)

(72) Inventors: Jordan A. Berger, Armonk, NY (US); John V. Monaco, Yorktown Heights, NY (US)

( * ) Notice: Subject to any disclaimer, the term of this patent is extended or adjusted under 35 U.S.C. 154(b) by 0 days.

(21) Appl. No.: 14/809,290

(22) Filed: Jul. 27, 2015

(65) Prior Publication Data

US 2017/0031588 A1 Feb. 2, 2017

(51) Int. Cl.
*G06F 3/0488* (2013.01)
*G06F 3/01* (2006.01)
*G06F 3/041* (2006.01)
*G06F 3/044* (2006.01)

(52) U.S. Cl.
CPC .......... *G06F 3/04886* (2013.01); *G06F 3/015* (2013.01); *G06F 3/044* (2013.01); *G06F 3/0414* (2013.01)

(58) Field of Classification Search
CPC .... G06F 3/04886; G06F 3/015; G06F 3/0418; G06F 3/044
See application file for complete search history.

(56) References Cited

U.S. PATENT DOCUMENTS

| | | | |
|---|---|---|---|
| 2009/0228901 A1* | 9/2009 | Beaver | G06F 3/0488 719/318 |
| 2010/0194682 A1* | 8/2010 | Orr | G06F 3/04886 345/156 |
| 2011/0304580 A1* | 12/2011 | Wu | G06F 3/021 345/173 |
| 2013/0337866 A1* | 12/2013 | Kim | H04W 4/20 455/557 |
| 2014/0240618 A1* | 8/2014 | Oraw | G06F 3/044 349/12 |
| 2015/0324116 A1* | 11/2015 | Marsden | H03K 17/9622 345/158 |
| 2015/0331508 A1* | 11/2015 | Nho | G06F 3/0421 345/173 |

OTHER PUBLICATIONS

Bergadano et al., User authentication through keystroke dynamics, ACM Transactions on Information and System Security, Nov. 4, 2002, pp. 367-397, vol. 5, No. 4, ACM, New York, NY. http://dl.acm.org/citation.cfm?doid=581271.581272.

(Continued)

*Primary Examiner* — Liliana Cerullo
(74) *Attorney, Agent, or Firm* — Soquel Group LLC

(57) ABSTRACT

A keyboard for cooperation with a keystroke and behavioral biometric analyzer, including a blank translucent surface for use as an input device, a capacitive layer mounted underneath the translucent surface, for enabling detection of touch location and touch pressure on the translucent surface, a projection system for dynamically projecting a visual layout of keys of a keyboard on the translucent surface, and a biometric generator, coupled with the capacitive layer, configured to receive user input in conformance with the projected layout of keys, and to generate therefrom a time series of touch location and touch pressure data, for use as data by a keystroke and behavioral biometric analyzer.

17 Claims, 15 Drawing Sheets

(56) References Cited

OTHER PUBLICATIONS

Gaines et al., Authentication by keystroke timing: some preliminary results, Rand Publication Series, May 1980, The Rand Corporation, Santa Monica, CA. https://www.rand.org/content/dam/rand/pubs/reports/2006/R2526.pdf.

Giancardo et al., Psychomotor impairment detection via finger interactions with a computer keyboard during natural typing,Scientific Reports, Apr. 16, 2015, Natur Publishing Group, London, United Kingdom. http://www.nature.com/articles/srep09678.

Karnan et al., Biometric personal authentication using keystroke dynamics: a review, Applied Soft Computing, Mar. 2011, pp. 1565-1573, vol. 11, Elsevier B.V., Amsterdam, Netherlands. http://www.sciencedirect.com/science/article/pii/S156849461000205X.

Monrose et al., Authentication via keystroke dynamics, CCS 97, 1997, pp. 48-56, ACM, New York, NY. http://dl.acm.org/citation.cfm?id=266434.

Monrose et al., Keystroke dynamics as a biometric for authentication, Future Generation Computer Systems, Feb. 2000, pp. 351-359, vol. 16, Issue 4. http://www.sciencedirect.com/science/article/pii/S0167739X9900059X.

Teh et al., A survey of keystroke dynamics biometrics, The Scientific World Journal, 2013, vol. 2013, Hindawi Publishing Corporation, Cairo, Egypt. http://www.hindawi.com/journals/tswj/2013/408280/.

* cited by examiner

UNIVERSAL KEYBOARD

FIELD OF THE INVENTION

The present invention relates to electronic keyboards.

BACKGROUND OF THE INVENTION

The keyboard is one of the most universal peripheral components for desktop and laptop computers, and yet it relies on the QWERTY system that dates back to the 1870's. It is arguably the most ancient part of the desktop and laptop computers in use today. The use of keyboards is ubiquitous with word processing, web browsing, multimedia streaming and gaming.

Many applications remap keys or key sequences to application-specific commands. For example, "Ctrl+n" creates a new document or opens a new window, depending on the context. The keyboard layout can be entirely remapped through software. The standard QWERTY layout is often associated with a US English key map, but many others exist. For example, some users switch to a DVORAK layout due to comfort, or use a language other than English on a QWERTY keyboard. Many applications allow the user to create time saving "macros", but most users do not take advantage of them due to the high barrier of learning how to program the macros. Users often purchase more than one keyboard or controller, each one made for a specific purpose. For word processing, some users like to use a keyboard with a relatively light touch, but when gaming they prefer a mechanical keyboard with a heavier pressure. Many gaming applications only utilize about 8 keys, and the unused keys become obsolete during gameplay. Many users in the graphics and imaging fields execute thousands of mouse clicks per day to perform tasks that could be highly simplified with a more intelligent human-computer interface.

The current field of keystroke dynamics, as described in

M. Karnan, M. Akila, N. Krishnaraj, Biometric personal authentication using keystroke dynamics: A review, *Applied Soft Computing*, Vol. 11, Issue 2, March 2011, pages 1565-1573, ISSN 1568-4946, http://dx.doi.org/10.1016/j.asoc.2010.08.003, http://www.sciencedirect.com/science/article/pii/S156849461000205X, and Pin Shen Teh, Andrew Beng Jin Teoh, and Shigang Yue, "A Survey of Keystroke Dynamics Biometrics," *The Scientific World Journal*, Vol. 2013, Article ID 408280, 24 pages, 2013. doi:10.1155/2013/408280, utilizes behavioral biometric data from users, as described in Fabian Monrose, Aviel D. Rubin, Keystroke dynamics as a biometric for authentication, *Future Generation Computer Systems*, Vol. 16, Issue 4, February 2000, pages 351-359, ISSN 0167-739X, http://dx.doi.org/10.1016/S0167-739X(99)00059-X, http://www.sciencedirect.com/science/article/pii/S0167739X9900059X, in order to perform a variety of important functions, such as on-line user authentication, as described in Bergadano, Francesco, Gunetti, Daniele, and Claudia Picardi, User authentication through keystroke dynamics, *ACM Transactions on Information and System Security (TISSEC)*, Vol. 5, issue 4, November 2002, pages 367-397, New York, ACM, ISSN: 1094-9224 EISSN: 1557-7406 doi:10.1145/581271.581272.

Researchers are studying use of keystrokes to detect physical ailments such as arthritis and Parkinson's disease, http://www.nature.com/srep/2015/150409/srep09678/full/srep09678.html).

Keyboards commercially available today are limited in that they can only provide timing information, while it has been shown that use of additional sensors, such as pressure and acceleration, significantly improves the performance of a keystroke biometric system. The demand for additional sensors continues to grow as keystroke dynamics is incorporated into an increasing number of applications.

Prior art virtual keyboards project onto surfaces, and will never likely be a "preferred" keyboard for any user. Virtual keyboards have a futuristic appearance, and can be used in place of keyboards for short sessions, but for the "normal" or "heavy" computer user, the virtual keyboard lacks many features.

Conventional and virtual keyboards can output keystrokes ("all or none") and timing data, but cannot measure pressure data, and lack the spatial resolution that allows, for example, estimation of finger size, limiting their use in advanced behavioral biometrics.

SUMMARY OF THE DESCRIPTION

Embodiments of the present invention relate to a universal keyboard, which is dynamically optimized for all key input to the computer, and is the first fully-compatible biometric keyboard. The keyboard includes a blank translucent surface, a capacitive array touch screen that transmits touch to the computer, and a projection system that dynamically projects the keyboard template or layout that is needed for each application. There are inter alia four types of projection systems: (1) micro-LED array applied to the under-surface of the keyboard, (2) projection system applied to a bar across the keyboard, (3) projection system that projects onto the surface from underneath the keyboard, and (4) touchscreen system.

The universal keyboard includes inter alia a speaker, a microphone, a webcam, an accelerometer, a USB connection, and an optional wireless module such as a BLUETOOTH® module.

The universal keyboard includes a device driver that initializes the keyboard, the projection system, the microphone, the webcam and a touch pad, that initializes a BLUETOOTH® pairing, that loads a sound file, and that dynamically projects a display file onto the keyboard. The driver also maps touch data to ASCII keystroke or bitmap data, as appropriate, formats the keystroke or bitmap data for output, and outputs the data via USB or such other data channel. Data output from the keyboard via the device driver may use a file format and communications protocol that conform to an existing or future standard.

There is thus provided in accordance with an embodiment of the present invention a keyboard for cooperation with a keystroke and behavioral biometric analyzer, including a blank translucent surface for use as an input device, a capacitive layer mounted underneath the translucent surface, for enabling detection of touch location and touch pressure on the translucent surface, a projection system for dynamically projecting a visual layout of keys of a keyboard on the translucent surface, and a biometric generator, coupled with the capacitive layer, configured to receive user input in conformance with the projected layout of keys, and to generate therefrom a time series of touch location and touch pressure data, for use as data by a keystroke and behavioral biometric analyzer.

There is additionally provided in accordance with an embodiment of the present invention a method for use by a keyboard in cooperation with a keystroke and behavioral biometric analyzer, including dynamically projecting a visual layout of keys onto a blank translucent surface, dynamically sensing touch location and touch pressure on the translucent surface at a sequence of times, and generating therefrom a data stream of touch location and touch pressure data for use by a keystroke and behavioral biometric analyzer, based on the projected visual layout of keys.

There is further provided in accordance with an embodiment of the present invention a keypad for cooperation with a computing device, including a blank translucent surface for use as an input device, a capacitive layer mounted underneath the translucent surface, for enabling detection of touch location on the translucent surface, a projection system for dynamically projecting a plurality of visual layouts of keys of a keypad on the translucent surface, wherein each visual layout includes ASCII character keys or graphical buttons, and a dynamic keyboard layout generator, coupled with the capacitive layer, with the projection system, and with a computing device, configured to dynamically control the projection system to project different ones of the plurality of layouts of keys on the translucent surface in response to user activity on the computing device, to receive user input in conformance with a currently projected layout of keys, and to generate therefrom a time series of ASCII characters or button selections for input to the computing device.

There is yet further provided in accordance with an embodiment of the present invention a method for use by a keypad in cooperation with a computing device, including dynamically controlling a projection system to project different ones of a plurality of visual layouts of keys of a keypad on a blank translucent surface, in response to user activity on a computing device, wherein each visual layout comprises ASCII character keys or graphical buttons, dynamically sensing touch locations on the translucent surface at a plurality of times, via a capacitive layer that is mounted under the translucent surface, and generating a data stream of ASCII characters or button selections, at a sequence of times, for input to the computing device, based on the projected layout of keys and the sensed touch locations, at each time in the sequence.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

Figure 1:
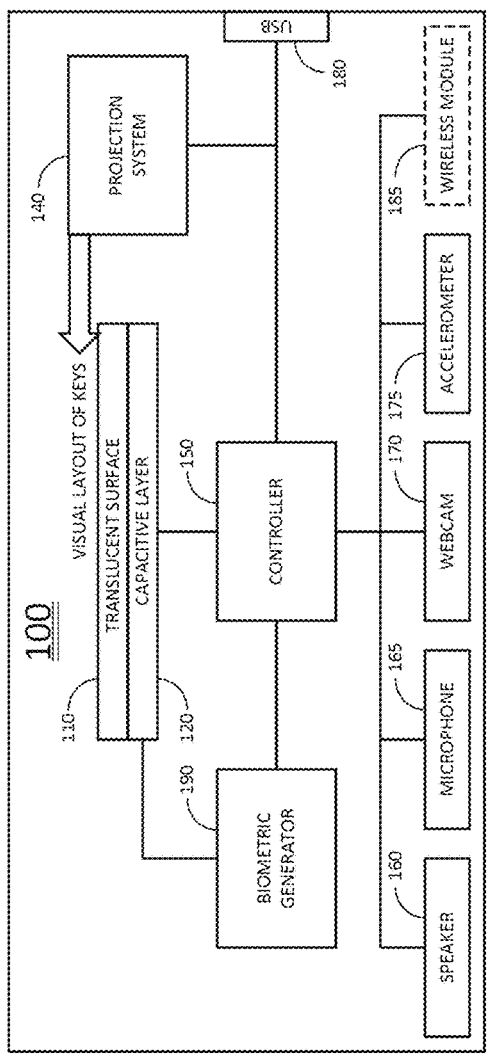
FIG. 1 is a simplified diagram of a keyboard for use in cooperation with a keystroke biometric analyzer, in accordance with an embodiment of the present invention.

| Element | Description |
|---------|-------------|
| 100 | keyboard |
| 110 | blank transparent surface |
| 120 | capacitive surface |
| 140 | projection system |
| 150 | controller |
| 160 | speaker |
| 165 | microphone |
| 170 | webcam |
| 175 | accelerometer |
| 180 | USB connector |
| 185 | wireless module |
| 190 | biometric generator |
| 200 | keyboard |
| 210 | blank transparent surface |
| 220 | capacitive surface |
| 240 | projection system |
| 250 | controller |
| 260 | speaker |
| 265 | microphone |
| 270 | webcam |
| 275 | accelerometer |
| 280 | USB connector |
| 285 | wireless module |
| 290 | dynamic keyboard layout generator |
| 300 | keyboard |
| 310 | finished acrylic material |
| 320 | alloy bond metal cover |
| 330 | microprocessor |
| 340 | lithium ion battery |
| 350 | micro-USB charging port |
| 360 | LED |
| 410 | silicone layer |
| 420 | touch sensor layer |
| 430 | acrylic layer |
| 440 | LED layer |
| 450 | acrylic blocks |
| 500 | layout of keys |
| 510 | character keys |
| 520 | space bar |

-continued

Table of elements in the figures

| Element | Description |
|---|---|
| 530 | cancel key |
| 540 | special character key |
| 550 | copy key |
| 560 | paste key |
| 570 | touch pad |
| 580 | sensitivity scroll bar |
| 600 | layout of keys |
| 610 | character keys |
| 620 | space bar |
| 630 | special keys |
| 640 | keys for language selection |
| 650 | key for adding a language |
| 680 | sensitivity scroll bar |
| 700 | layout of keys |
| 710 | directional keys |
| 720 | special key |
| 730 | special key |
| 740 | special key |
| 750 | special key |
| 800 | method |
| 810 | flowchart operation |
| 820 | flowchart operation |
| 830 | flowchart operation |
| 900 | method |
| 910 | flowchart operation |
| 920 | flowchart operation |
| 930 | flowchart operation |
| 1000 | keyboard driver |
| 1100 | mouse driver |
| 1200 | keyboard embodiment using micro-LED array projection |
| 1210 | silicone layer |
| 1220 | capacitive layer |
| 1230 | acrylic layer |
| 1240 | micro LED layer |
| 1300 | keyboard embodiment using projection bar |
| 1310 | acrylic keyboard |
| 1340 | projection bar |
| 1400 | keyboard embodiment using projection underneath keyboard |
| 1410 | acrylic layer |
| 1420 | support layer |
| 1440 | projection device |
| 1500 | keyboard embodiment using touchscreen |
| 1510 | touchscreen |

DETAILED DESCRIPTION

Embodiments of the present invention relate to a universal keyboard, referred to herein as the "ONE-KEYBOARD", which is a universal solution to all key input to the computer, and is the first fully-compatible biometric keyboard.

The keyboard consists of a blank translucent surface, a capacitive array touch screen that transmits touch to the computer, and a projection system that projects the keyboard template or layout that is needed for each application. As described below, there are inter alia four types of projection systems: (1) micro-LED array applied to the under-surface of the keyboard, (2) projection system applied to a bar across the keyboard, (3) projection system that projects onto the surface from underneath the keyboard, and (4) touchscreen system.

The ONE KEYBOARD comes in a variety of sizes and in a software-only version. A user has a choice of silicone pads that adhere to the surface of the ONE KEYBOARD, in order to find the preferred "touch". The ONE KEYBOARD is supported on two legs that are adjustable to the user's preferred angle. A small speaker in the keyboard allows the user to choose from a variety of pre-recorded sounds to simulate the "click" of a key and provide minimal haptic feedback. The user can choose a binary sound, which makes a sound at a single decibel level, or variable sounds that are louder or softer depending on the pressure applied to the key. The ONE KEYBOARD comes in wired or wireless (e.g., BLUETOOTH®) models. Both models display the internal circuitry through the acrylic, for aesthetic purposes. The touch sensors may be set to whatever threshold the user prefers, and the threshold may vary based on the application being used. There are optional accessories, including inter alia a mouse, microphone, webcam and speaker.

Reference is made to FIG. 1, which is a simplified diagram of a keyboard 100 for use in cooperation with a keystroke biometric analyzer, in accordance with an embodiment of the present invention. As shown in FIG. 1, keyboard 100 includes a blank translucent surface 110 for use as an input device. Translucent surface 110 may be inter alia a silicone surface. A capacitive layer 120 is mounted underneath translucent surface 110, for enabling detection of touch location and touch pressure on translucent surface 110. A projection system 140 projects a visual layout of keys of a keyboard on translucent surface 100. A controller 150 includes circuitry to control operation of the components of keyboard 100. Keyboard 100 includes a speaker 160, a microphone 165, a webcam 170, an accelerometer 175, and a USB connector 180. Accelerometer 175 measures small movements in the keyboard induced by a user's actions. Keyboard 100 also includes an optional wireless module 185, for short-range wireless communication such as BLUETOOTH®.

Keyboard 100 includes a biometric generator 190 operative to receive user input in conformance with the projected layout of keys, and to generate therefrom a time series of touch location and touch pressure data, for use as data by a keystroke biometric analyzer.

Figure 2:
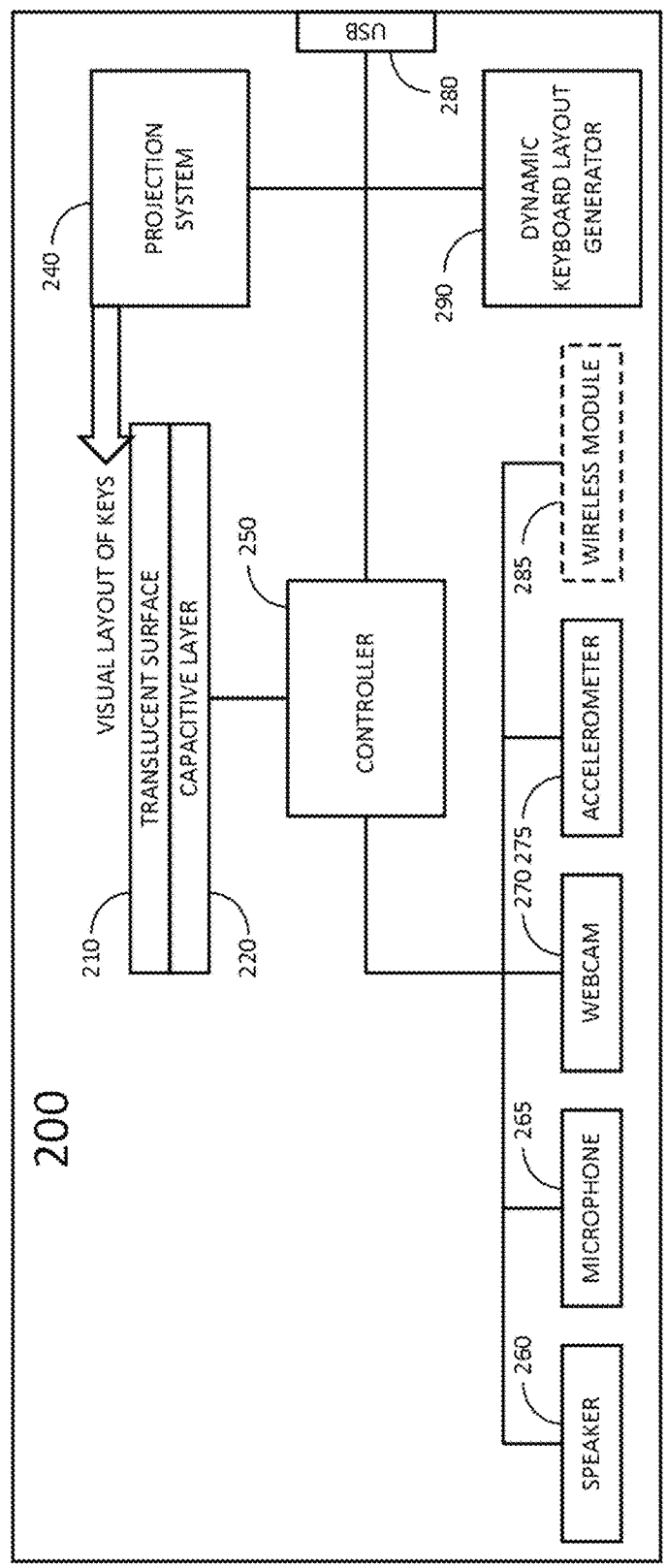
FIG. 2 is a simplified diagram of a keyboard with interactive generation of layouts of keys, in accordance with an embodiment of the present invention.

Reference is made to FIG. 2, which is a simplified diagram of a keyboard 200 with interactive generation of layouts of keys, in accordance with an embodiment of the present invention. As shown in FIG. 2, keyboard 200 includes a blank translucent surface 210 for use as an input device. Translucent surface 210 may be inter alia a silicone surface. A capacitive layer 220 is mounted underneath translucent surface 210, for enabling detection of touch location on translucent surface 210. A projection system 240 dynamically projects a plurality of visual layouts of keys of a keypad on translucent surface 210, where each visual layout includes ASCII character keys or graphical buttons. A controller 250 includes circuitry to control operation of the components of keyboard 200. Keyboard 200 includes a speaker 260, a microphone 265, a webcam 270, an accelerometer 275, and a USB connector 280. Accelerometer 275 measures small movements in the keyboard induced by a user's actions. Keyboard 200 also includes an optional wireless module 285, for short-range wireless communication such as BLUETOOTH®.

Keyboard 200 includes a dynamic keyboard layout generator 290 operative to dynamically control projection system 240 to project different layouts of keys on translucent surface 210 in response to user activity on a computing device, to receive user input in conformance with a currently projected layout of keys, and to generate therefrom a time series of ASCII characters or button selections for input to the computing device.

It will be appreciated by those skilled in the art that the embodiments shown in FIGS. 1 and 2 may be combined into an embodiment that combines biometric generator 190 with dynamic keyboard layout generator 290.

Figure 3:
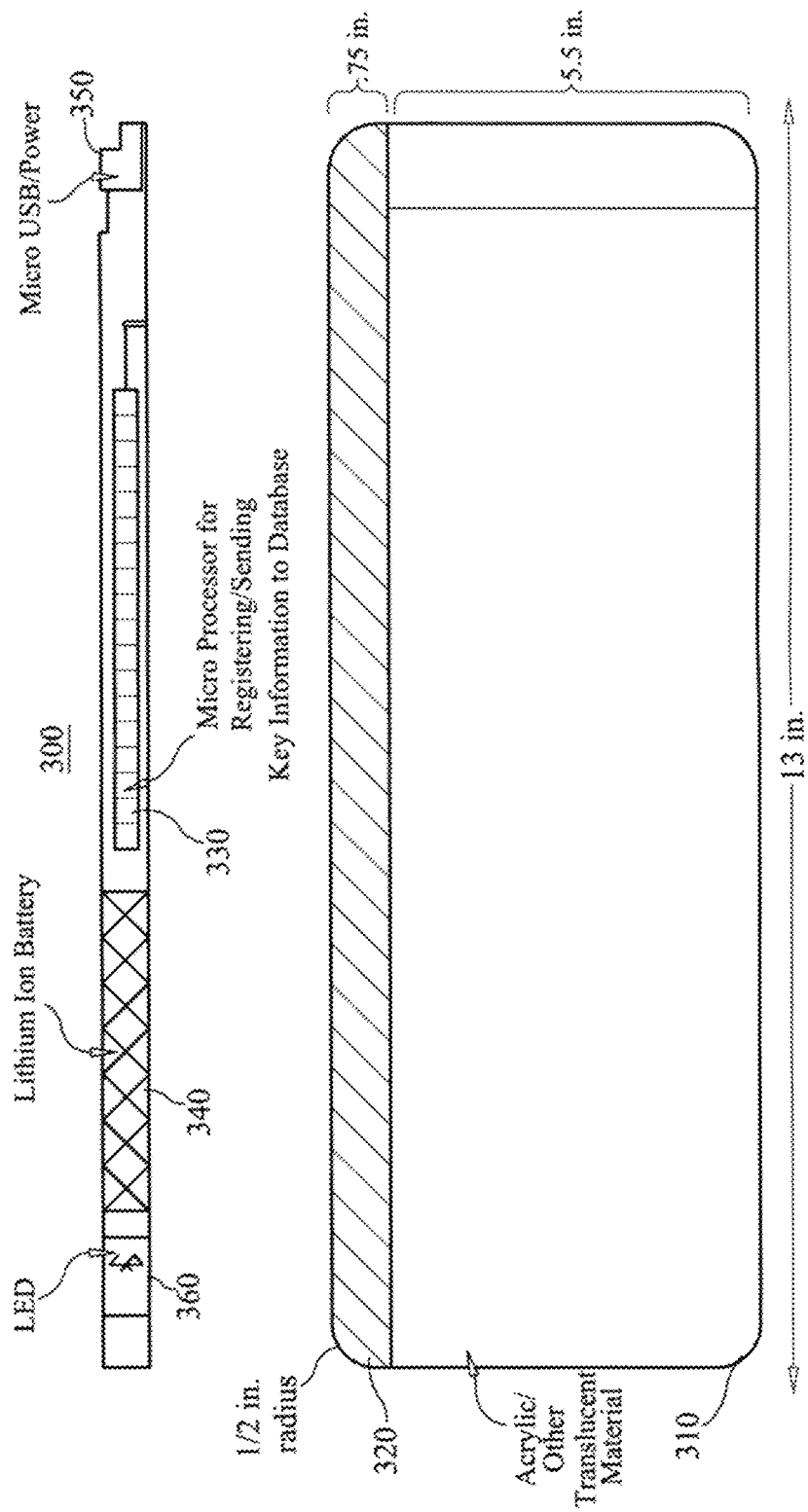
FIG. 3 is a simplified top view of a keyboard, in accordance with an embodiment of the present invention.

Reference is made to FIG. 3, which is a simplified top view of a keyboard 300, in accordance with an embodiment of the present invention. As shown in FIG. 3, keyboard 300 is approximately 13" in length and 5.5" in width, and is formed by an acrylic or other translucent material 310 including inter alia glass, plexi-glass and a combination of such materials. The components of keyboard 300 are covered by an alloy bond metal cover 320 having a width of 0.75", with upper corners curved in an arc of a circle of 0.5" radius. Keyboard 300 includes a microprocessor 330 for registering and sending key information to a database, an 1100 mAh lithium ion battery 340, a micro-USB connector charging port 350, and an LED 360.

Although element 310 is indicated as being an acrylic material, this is not necessary for practice of the invention, and element 310 may alternatively be comprised of glass, plexi-glass or such other translucent material, or a combination of such materials.

Figure 4:
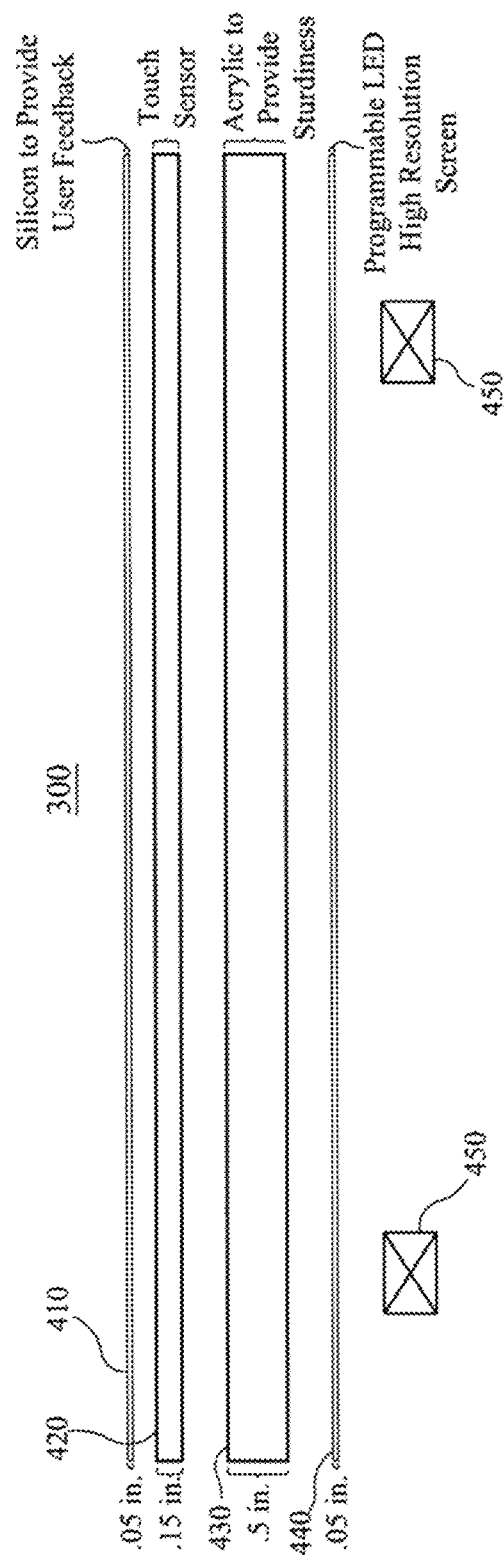
FIG. 4 is a simplified side view of the keyboard of FIG. 3 showing four layers, in accordance with an embodiment of the present invention.

Reference is made to FIG. 4, which is a simplified side view of keyboard 300 showing four layers, in accordance with an embodiment of the present invention. As shown in FIG. 4, keyboard 300 includes an upper layer 410 of silicone having a thickness of 0.05", to provide user feedback. Beneath layer 410 is a layer 420 having a thickness of 0.15" with a touch sensor. Beneath layer 420 is a layer 430 of acrylic having a thickness of 0.5", to provide sturdiness. Beneath layer 430 is a layer 440 having a thickness of 0.05", with a programmable high resolution LED screen. Underneath keyboard 300 are acrylic blocks 450, to angle the keyboard for ease of use.

Figure 5:
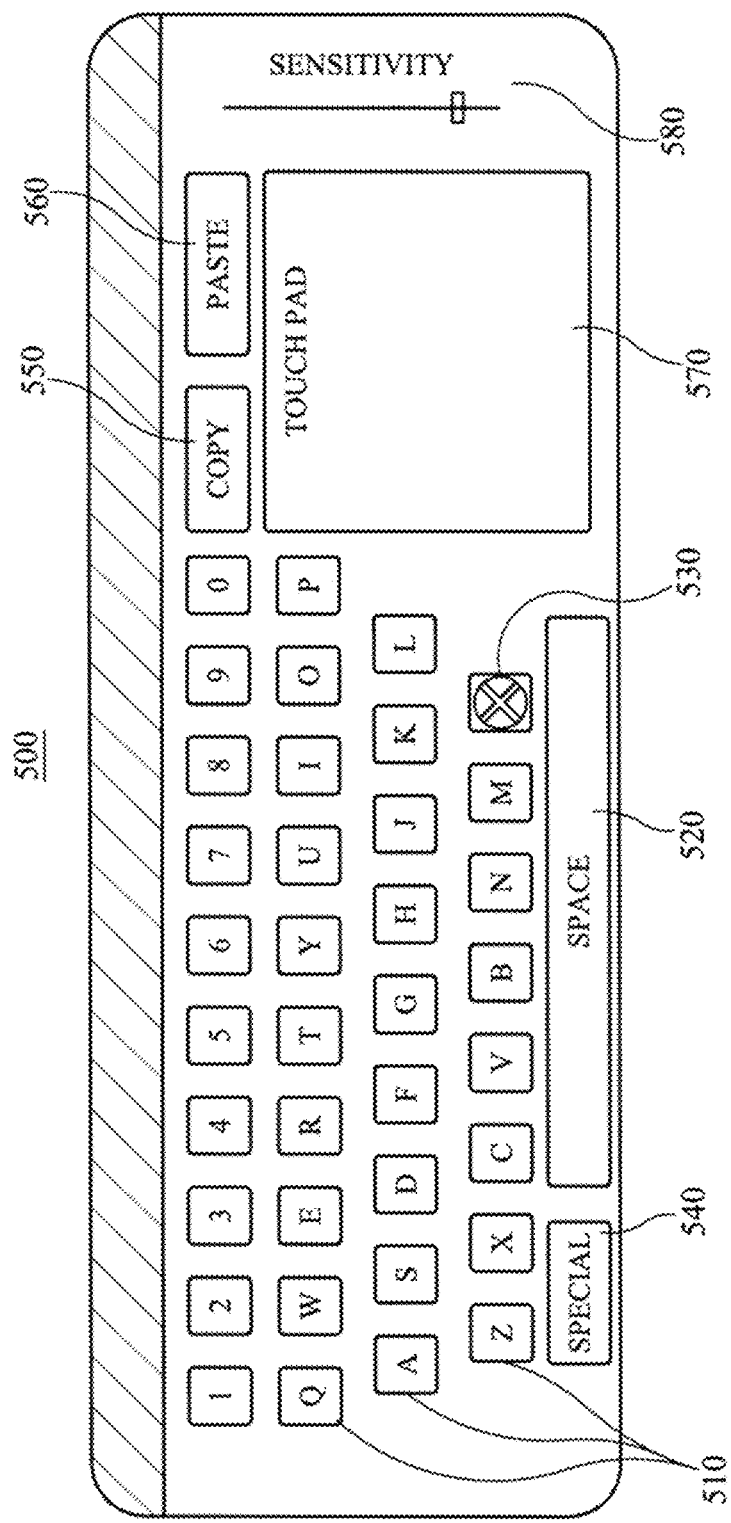
FIG. 5 is a simplified illustration of a layout of keys for word processing, for use with the keyboard of FIG. 3, in accordance with an embodiment of the present invention.

Reference is made to FIG. 5, which is a simplified illustration of a layout of keys 500 for word processing, for use with keyboard 300, in accordance with an embodiment of the present invention. Layout 500 includes QWERTY character keys 510, a space bar 520, a cancel key 530, a special character key 540, and respective copy and paste keys 550 and 560. Layout 500 also includes a touch pad 570, and a scroll bar 580 for touch sensitivity.

Figure 6:
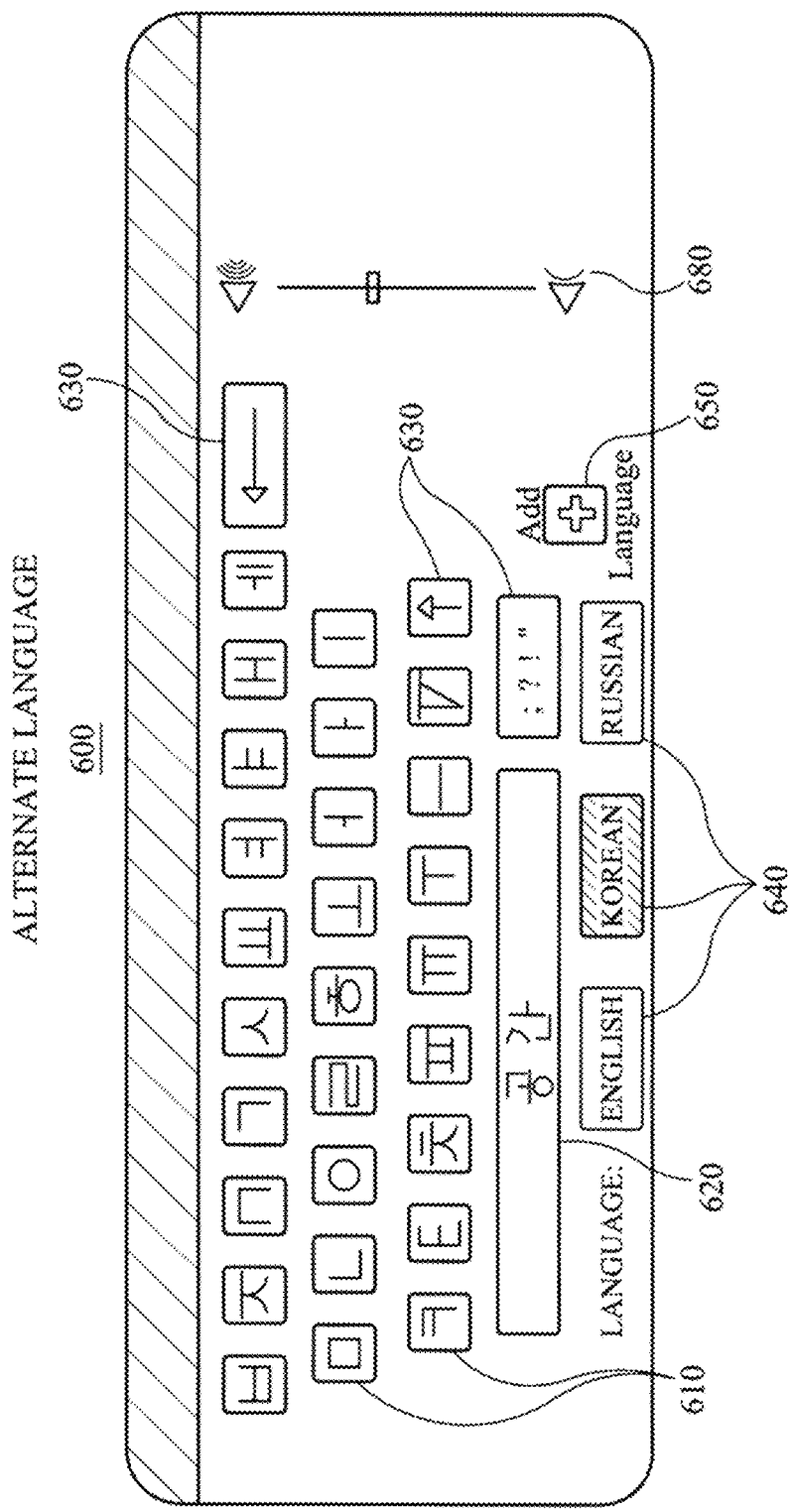
FIG. 6 is a simplified illustration of a layout of keys for an alternate language, for use with the keyboard of FIG. 3, in accordance with an embodiment of the present invention.

Reference is made to FIG. 6, which is a simplified illustration of a layout of keys 600 for an alternate language, for use with keyboard 300, in accordance with an embodiment of the present invention. Layout 600 includes character keys 610 for a Korean alphabet, a space bar 620, special keys 630, and keys 640 for language selection. A key 650 is provided for adding additional languages. Layout 600 also includes a scroll bar 680 for touch sensitivity.

Figure 7:
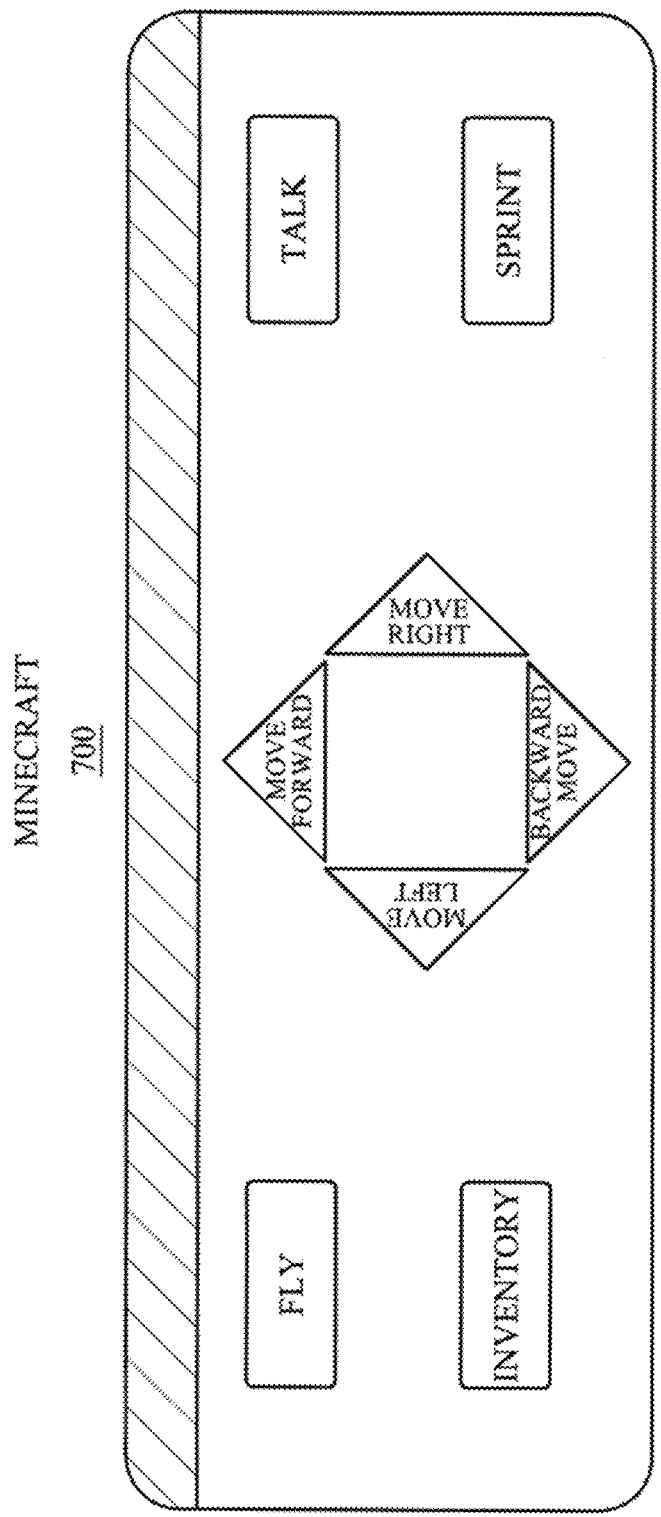
FIG. 7 is a simplified illustration of a layout of keys for an interactive MINECRAFT® game, for use with the keyboard of FIG. 3, in accordance with an embodiment of the present invention.

Reference is made to FIG. 7, which is a simplified illustration of a layout of keys 700 for an interactive MINECRAFT® game, manufactured by Mojang Synergies AB of Stockholm, Sweden, for use with keyboard 300, in accordance with an embodiment of the present invention. Layout 700 includes directional keys 710, and respective keys 720, 730, 740 and 750 for "FLY", "TALK", "INVENTORY" and "SPRINT".

It will be appreciated by those skilled in the art that the layouts 500, 600 and 700 of respective FIGS. 5, 6 and 7, are interactively changed via projection system 240. In particular, both the appearance and the function of the keyboard layout changes dynamically, based on operations performed by a user.

Figure 8:
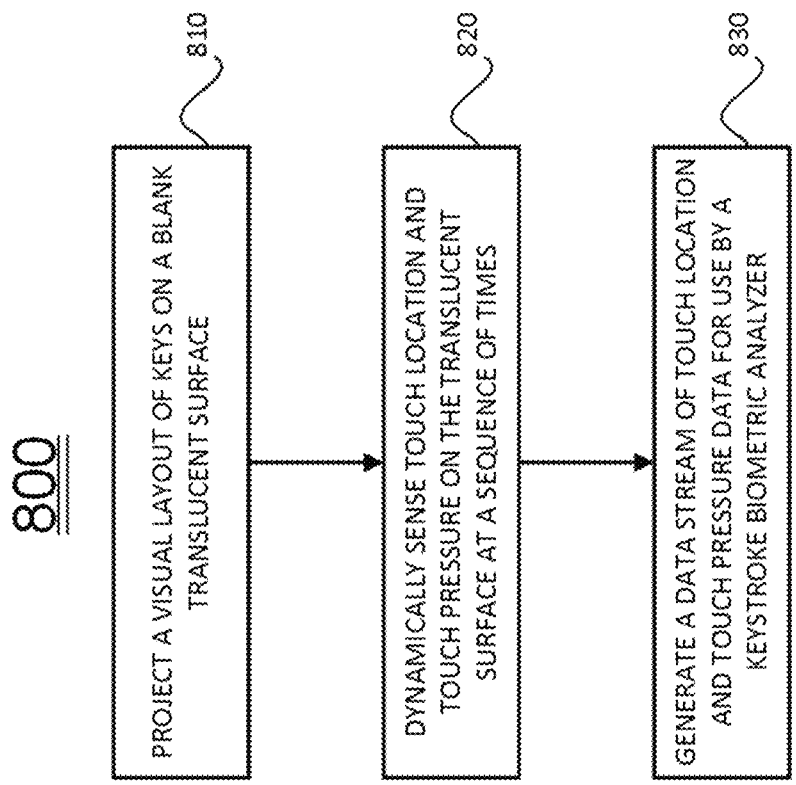
FIG. 8 is a simplified flowchart of a method for using a keyboard to generate data for a keystroke biometric analyzer, in accordance with an embodiment of the present invention.

Reference is made to FIG. 8, which is a simplified flowchart of a method 800 for using a keyboard to generate data for a keystroke biometric analyzer, in accordance with an embodiment of the present invention. At operation 810, projection system 140 (FIG. 1) projects a visual layout of keys onto translucent surface 110. At operation 820, capacitive layer 120 dynamically senses touch location and touch pressure on translucent surface 110 at a sequence of times. At operation 830, biometric generator 190 generates a data stream of touch location and touch pressure data for use by a keystroke biometric analyzer.

Figure 9:
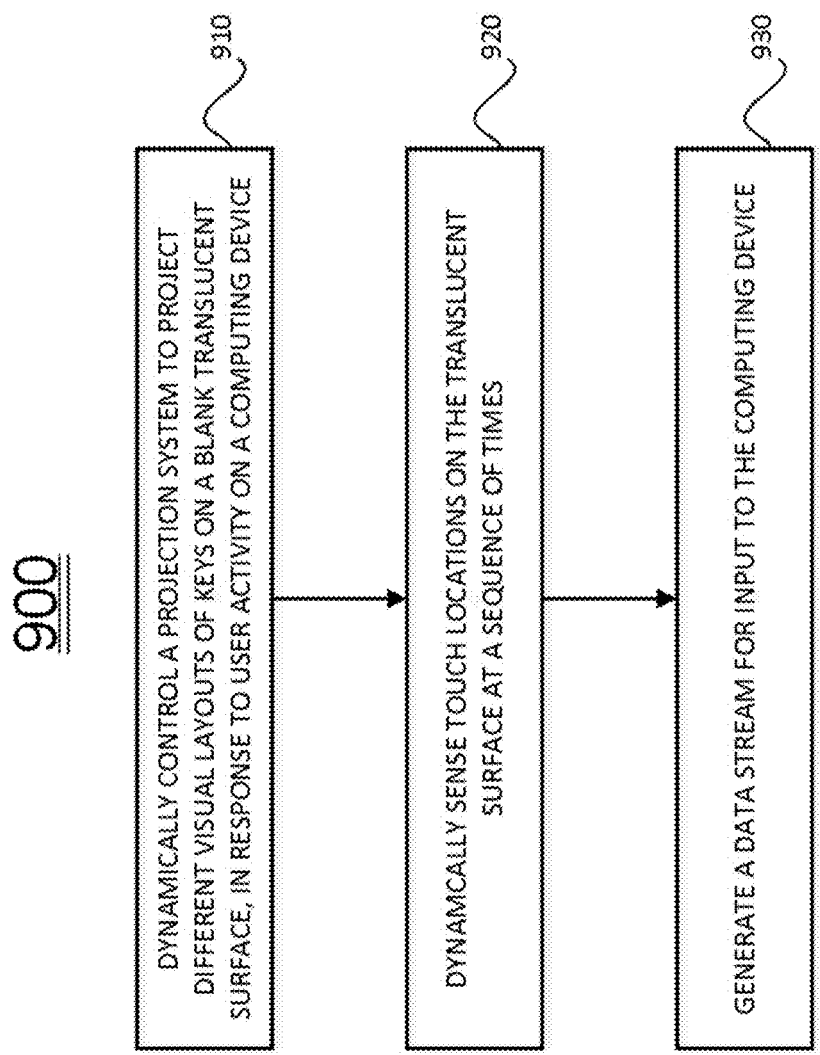
FIG. 9 is a simplified flowchart of a method for interactively generating layouts of keys for a keyboard, in accordance with an embodiment of the present invention.

Reference is made to FIG. 9, which is a simplified diagram of a method 900 for interactively generating layouts of keys for a keyboard, in accordance with an embodiment of the present invention. At operation 910, dynamic keyboard layout generator 290 (FIG. 2) dynamically controls projection system 240 to project different ones of a plurality of visual layouts of keys of a keypad on translucent surface 210, in response to user activity on a computing device, where each visual layout comprises ASCII character keys or graphical buttons. At operation 920, capacitive layer 220 dynamically senses touch locations on the translucent surface at a sequence of times. At operation 930, dynamic keyboard generator 290 generates a data stream, such as a data stream of ASCII characters or button selections, at a sequence of times, for input to the computing device, based on the projected layout of keys and the sensed touch locations, at each time in the sequence.

It will be appreciated by those skilled in the art that the methods shown in FIGS. 8 and 9 may be combined into a method that combines biometric data generation with dynamic keyboard layout generation.

Figure 10:
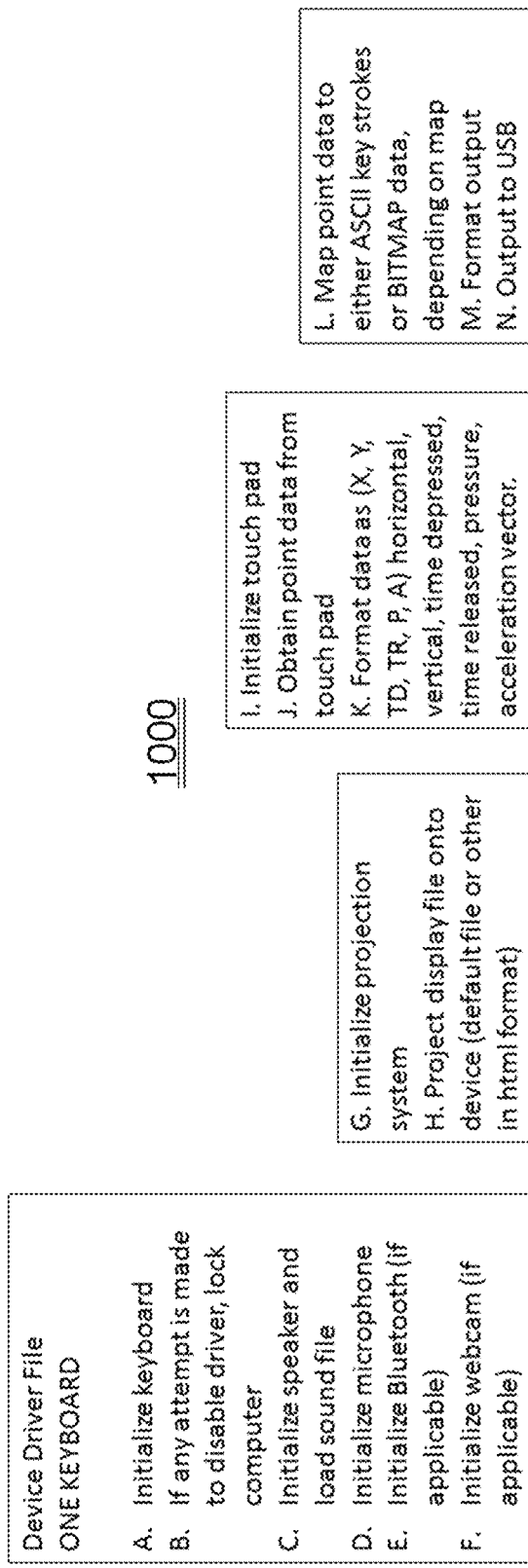
FIG. 10 is a simplified diagram of a keyboard device driver, in accordance with an embodiment of the present invention.

Reference is made to FIG. 10, which is a simplified diagram of a keyboard device driver 1000 for the ONE KEYBOARD, in accordance with an embodiment of the present invention. As shown in FIG. 10, functions of the keyboard driver include inter alia:

A. initializing the keyboard;
B. locking the computer, in response to any attempt to disable the driver;
C. initializing a speaker and loading a sound file;
D. initializing a microphone;
E. initializing a BLUETOOTH® pairing;
F. initializing a webcam;
G. initializing a projection system;
H. projecting a display file onto the keyboard;
I. initializing a touch pad;
J. obtaining a time series of touch data from the touch pad; and
K. formatting the touch data for output as a continuous data stream (X, Y, $T_D$, $T_R$, P, A), where
   X is the horizontal location,
   Y is the vertical location,
   $T_D$ is the time (in milliseconds) that the key is depressed,
   $T_R$ is the time (in milliseconds) that the key is released,
   P is the pressure (in milligrams) placed upon the key, and
   A is the acceleration vector (in m/s$^2$) for small movements in the keyboard induced by a user's actions;
L. map touch data to ASCII keystroke or bitmap data, as appropriate;
M. format the keystroke or bitmap data for output; and
N. output via USB.

Data output from the keyboard via a device driver may use a file format and communications protocol that conform to an existing or future standard. The lowest level output from the ONE KEYBOARD is the continuous data stream of data (X, Y, $T_D$, $T_R$, P, A). In addition, the driver estimates the user's finger size, S, using an edge-detection algorithm, where S is the estimated two-dimensional area of the user's finger as estimated by detecting the diameter, d, of the finger while the key is depressed (e.g., $S=\frac{1}{4}\pi d^2$). The raw pixels covered by the finger are also made available.

When appropriate, touch data is converted (i.e., mapped) onto ASCII keystrokes, and, when needed, the data is converted to graphical data. For example, if the user presses the keyboard where the "J" key is located, the ASCII output for 3 is sent with the associated pressure measurement; if the user creates a signature on a touchpad, the signature is mapped to a bitmap file, with a corresponding "user pressure matrix", which is a 3D matrix containing the 2D pressure applied along a time axis.

Keyboard device driver 1000 may be implemented in software, firmware, hardware, or a combination of software, firmware and hardware.

Figure 11:
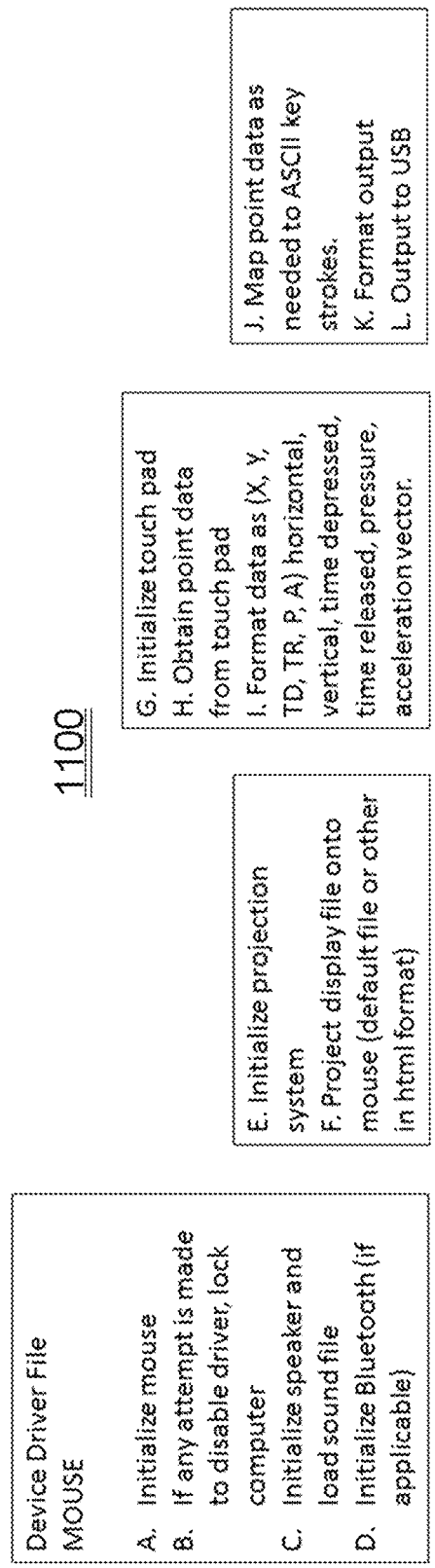
FIG. 11 is a simplified diagram of a mouse device driver, in accordance with an embodiment of the present invention.

Reference is made to FIG. 11, which is a simplified diagram of a mouse device driver 1100, in accordance with an embodiment of the present invention. The mouse that accompanies the ONE KEYBOARD is essentially a miniature version of the keyboard, and is incorporated into the same application. Many optical mouse devices have been created with more than one button or wheel, such as the gaming mice (http://www.razerzone.com/gaming-mice) manufactured by Razer Pte Ltd of Singapore, and such as the MAGIC MOUSE® (http://www.apple.com/magicmouse/) manufactured by Apple Inc. of Cupertino, Calif., in order to facilitate the user's interaction with programs that require the same operations over and over again. This is popular in the gaming community. As another example, a radiologist uses the same features of "Zoom", "Pan", "Window" and "Level" to interpret 50 or 100 medical images a day. At this time, he can either use the same repetitive mouse clicks, or try to find a mouse with some added buttons; the mouse that accompanies the ONE KEYBOARD creates a custom panel of buttons. For anyone who does work that requires repetitive tasks, the mouse that accompanies the ONE KEYBOARD is a highly ergonomic solution. The mouse displays user-definable buttons, and collects a small subset of biometric data.

Mouse device driver 1100 may be implemented in software, firmware, hardware, or a combination of software, firmware and hardware.

The ONE KEYBOARD employs a projection system to dynamically adapt a layout of keys to the user's application. If the user is typing a document, the projected layout of keys conforms to a standard keyboard, and switches between languages, mathematical symbols and graphics, as needed. For a user who uses more than one language, the projected layout of keys includes keys in any language, and further includes a "Translate" button that enables the user to type in one language and have it translated to another language. There are hundreds of keyboard layouts being used throughout the world today, any of which may be projected on the ONE KEYBOARD, and the projected keys may be a single color, or may be color-coded, or may be any other design. When the user is working on a photo-book, for example, with a website such as SHUTTERFLY®, owned by Shutterfly, Inc. of Redwood City, Calif., the ONE KEYBOARD projects a section that shows inter alia a "Page Layout" button, a "Background" button, an "Add-a-Page" button, a "Theme" button, and a "Color" button. When the user adds photos to the book, the ONE KEYBOARD projects a section that shows inter alia an "Add Photos from Computer" button, an "Add Photos from Shutterfly" button, and an "Add Photos from Instagram" button. There are icons of photos, text and other objects that the user may drag into his book. The user may use gestures to edit a photo, resize the photo, change the contrast, brightness, hue, saturation, and make other adjustments. When the user switches between applications, such as working on a document, and then opening an Internet browser to look something up for the document, the keyboard switches between modes optimized for each application, and produces a set of custom buttons such as "Copy", "Paste" and "Create Hyperlink", to facilitate the interaction between applications. The keyboard works in a highly synchronized fashion with the user, creating the correct keys and icons for each application, and eliminating the need for hundreds of mouse clicks. If authentication is needed, the collected biometric data is used to verify the identity of the user using an external biometric analyzer.

As described below, there are inter alia four embodiments of projection systems: (1) micro-LED array applied to the under-surface of the keyboard, (2) projection system applied to a bar across the keyboard, (3) projection system that projects onto the surface from underneath the keyboard, and (4) touchscreen system.

Figure 12:
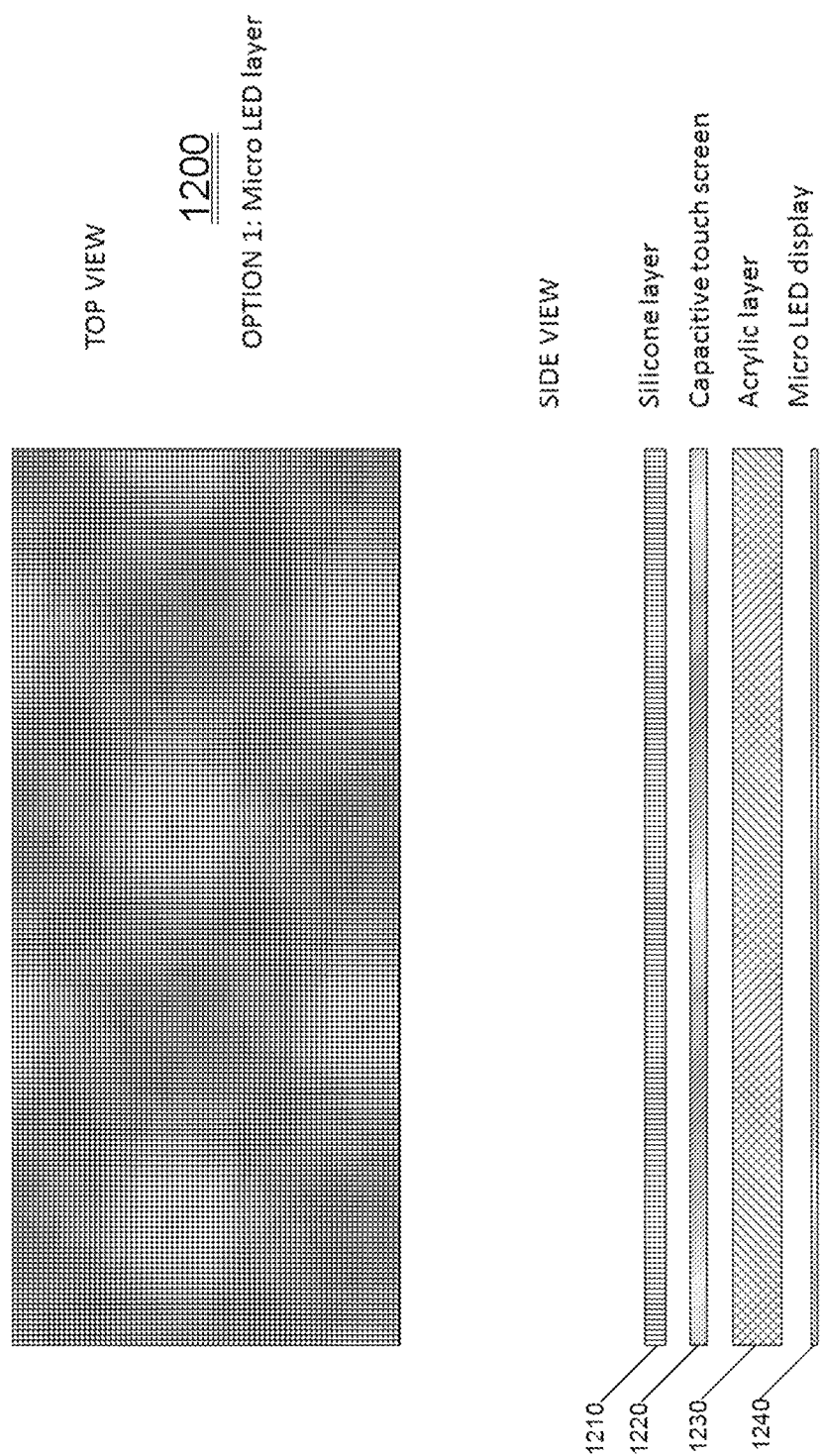
FIG. 12 is a simplified diagram of a keyboard using a micro-LED array projection system, in accordance with an embodiment of the present invention.

Reference is made to FIG. 12, which is a simplified of a keyboard 1200 using a micro-LED array projection system, similar to keyboard 300 shown in FIG. 4, in accordance with a first embodiment of the present invention. Shown in FIG. 12 is a silicone surface 1210, exposed for touch by a user. Underneath silicone surface 1210 is a capacitive touch layer 1220, for detecting touch location and touch pressure when a user touches silicone surface 1210. Underneath capacitive touch layer 1220 is an acrylic layer 1230.

A pattern of keys is projected onto silicone surface 1210 by a micro LED array 1240, underneath acrylic layer 1230.

A controller (not shown) receives user input in conformance with the projected layout of keys, and generates a time series of touch location and touch pressure data therefrom. The touch location and pressure data may be used inter alia by a keystroke biometric analyzer, as explained below.

Figure 13:
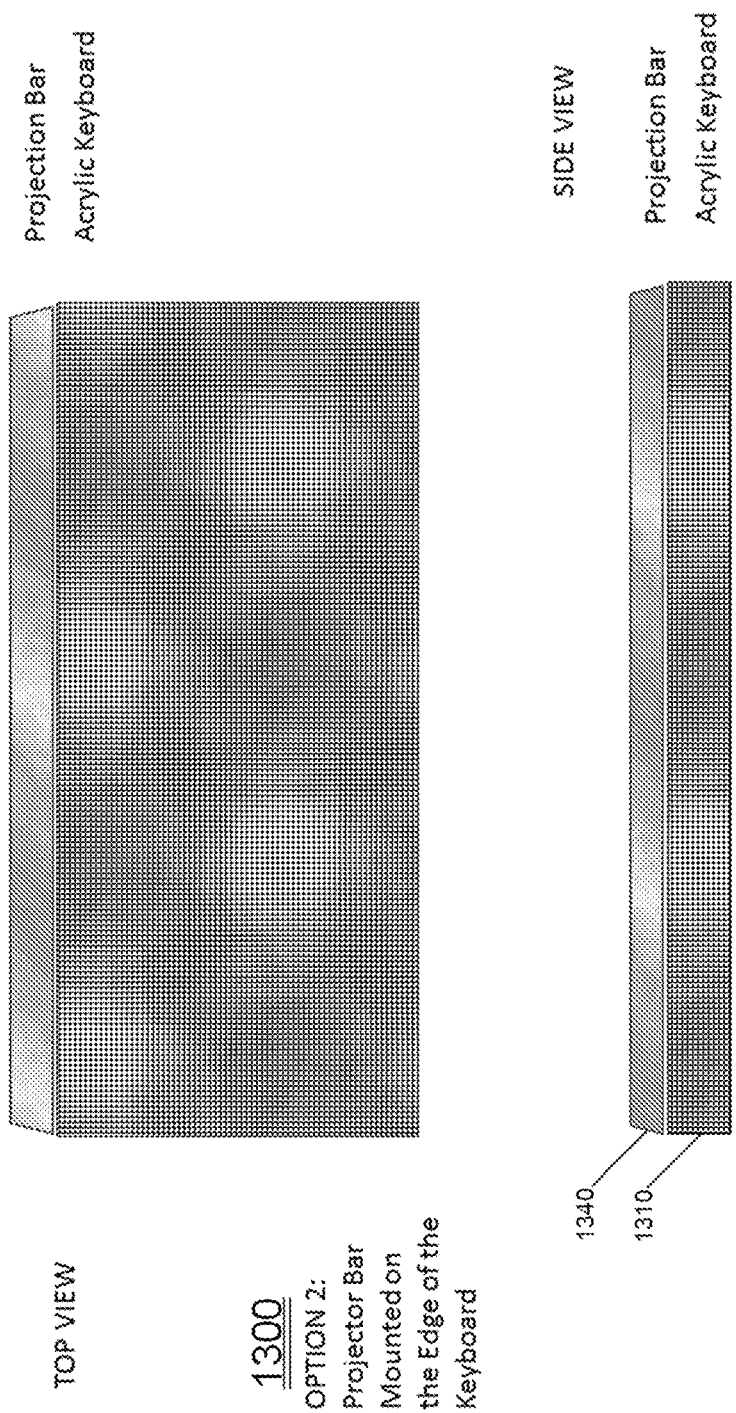
FIG. 13 is a simplified diagram of a keyboard using a projection system applied to a bar across the keyboard, in accordance with an embodiment of the present invention.

Reference is made to FIG. 13, which is a simplified diagram of a keyboard 1300 using a projection system applied to a bar across the keyboard, in accordance with an embodiment of the present invention. Shown in FIG. 13 is an acrylic keyboard 1310 with a projection bar 1340.

Figure 14:
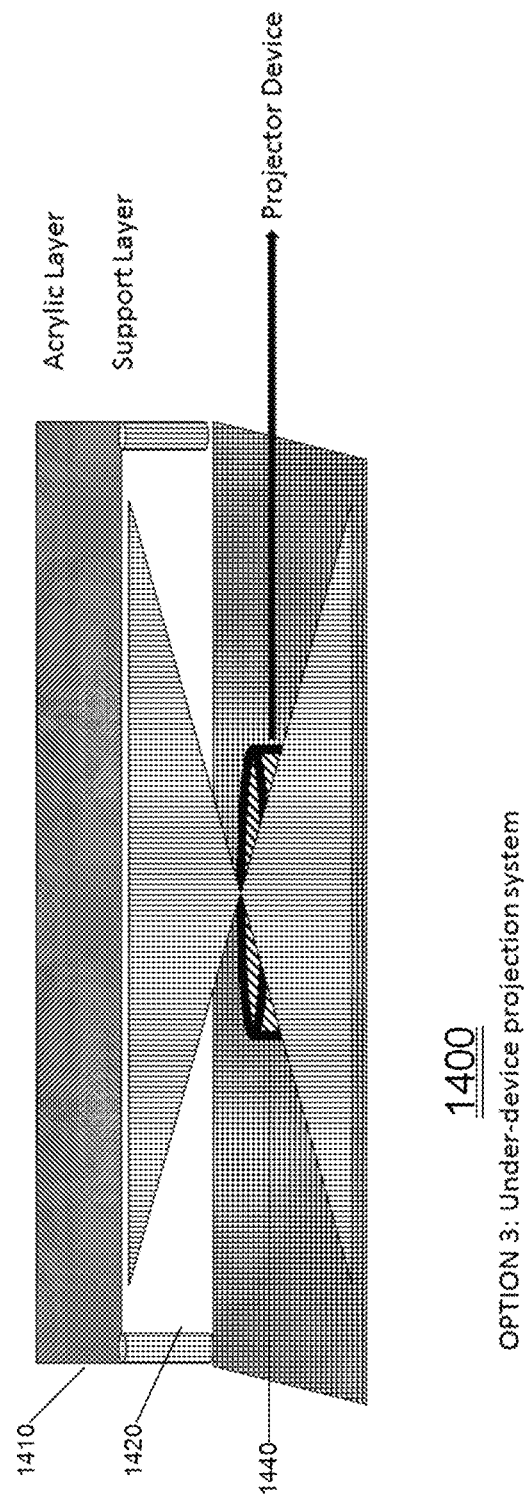
FIG. 14 is a simplified diagram of a keyboard using a projection system that projects onto the surface from underneath the keyboard, in accordance with an embodiment of the present invention.

Reference is made to FIG. 14, which is a simplified diagram of a keyboard 1400 using a projection system that projects onto the surface from underneath the keyboard, in accordance with an embodiment of the present invention. Shown in FIG. 14 is an acrylic surface 1410. A support layer 1420 is underneath acrylic surface 1410. Within support layer 1420 is a projector device 1440, which projects a pattern of keys onto acrylic surface 1410.

Figure 15:
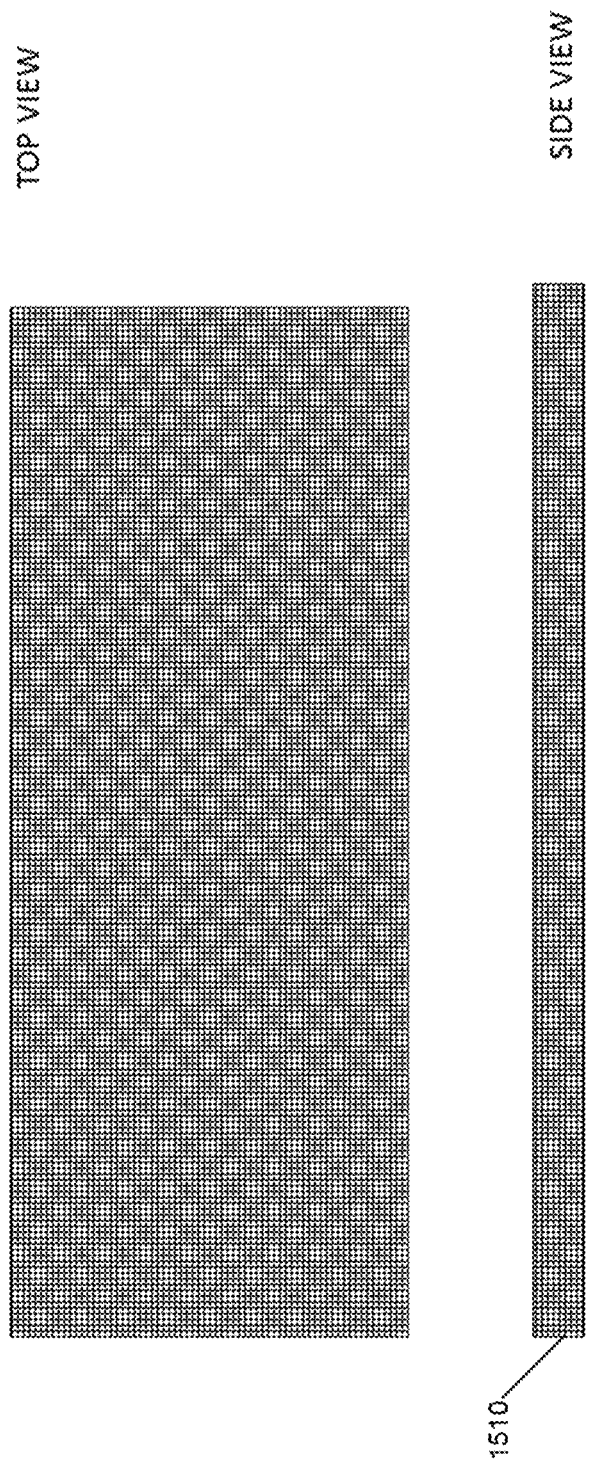
FIG. 15 is a simplified diagram of a keyboard using a touchscreen, in accordance with an embodiment of the present invention.

Reference is made to FIG. 15, which is a simplified diagram of a keyboard 1500 using a touchscreen, in accordance with an embodiment of the present invention. Keyboard 1500 uses a touch pad 1510.

Two or more of the projection systems of FIGS. 12-15 may be combined together into a multi-projection keyboard.

One of the central features of the ONE KEYBOARD is that it uses behavioral biometrics to learn the touch patterns of every individual, via a process termed "keystroke dynamics". This is a security feature to supplement conventional means of authentication, such as username and password, and may also be used as a form of error correction. At the basic level, the device registers the behavioral data associated with each time the user touches the keyboard. Over a short period of time, the data gathered creates a "behavioral profile" for the user, based on timing, pressure and finger size, mapped onto a two-dimensional space. Some of the variations in pressure are due to (a) physical traits of the user, such as finger size and strength, (b) the distance from the center of the device, and (c) the user's intentions based on each application. From the behavioral profile, biometric information can be extracted to create a "biometric profile". The biometric profile is highly reproducible and specific for each individual. Once created, the profile is a valuable part of the system. The biometric profile can be used to grant and restrict access to a system, identify the device owner, and generate a unique encryption key that can be used to digitally sign documents.

With the user's behavioral profile, the ONE KEYBOARD improves workflow. Based on patterns gleaned from the user's experience, the ONE KEYBOARD corrects common mistakes made repeatedly by the user, and suggests moving the position or layout of various aspects of the keyboard for improved comfort. By determining the size of a user's fingers, and the type and number of errors made by the user, the ONE KEYBOARD suggests changes in the layout of keys that can improve the user's experience. E.g., a larger set of keys may be more efficient for certain users. On a wider scale, a company may utilize aggregated biometric data to identify patterns among large numbers of employees that might be slowing productivity. A cloud-based system, when applied to the user profile data, determines ways to improve workflow in a widely used program, for example, such as PHOTOSHOP®, developed and marketed by Adobe Systems of San Jose, Calif. Software developers may desire the ability to study aggregated behavioral data in order to improve the development of their next generation of applications.

Security is another major component of the ONE KEYBOARD. With the user profile, the ONE KEYBOARD quickly detects when someone other than an authorized user is trying to access the system. Within a few lines of typing, the biometric pattern of the typist discriminates between an authorized user and an intruder. Companies interested in network security use this as a means of ensuring that only the correct user accesses each device. Common examples of this are on-line courses and test-taking, on-line e-commerce, and social networking companies who wish to prevent on-line bullying by "anonymous" users. Once the ONE KEYBOARD is attached to a computer, the driver can prevent anyone from detaching it and attempting to access the computer with a non-biometric keyboard. Currently, many behavioral biometric programs not only reject intruders, but they actually identify the intruder by their own behavioral biometric profile.

Using the ONE KEYBOARD and its associated methodology, on-line learning sites such as Coursera of Mountain View, Calif., and Khan Academy of New York, N.Y., testing companies such as The College Board of New York, N.Y., and ACT of Iowa City, Iowa, and any company seeking to verify/authenticate users who are accessing their systems via a remote connection, will increase the security of their systems dramatically.

An important component of the ONE KEYBOARD is software device driver 1000 for the keyboard, shown in FIG. 10, which contains the necessary calibration and settings for the keyboard to be customized for each user.

A companion to the ONE KEYBOARD is the biometric learning algorithm. This algorithm collects data from the keyboard and then utilizes that data to "learn" from each user's experiences. Typing mistakes tend to be repetitive, such as touching a certain key too lightly, or misspelling some specific words because of inverting the letters. If a user misspells a word repeatedly, the algorithm determines if the error is due to incomplete activation of a key, or due to another error such as inversion of letters. It then maintains a file of these learned experiences for each user and compensates for them, so that the user experiences an error-free interaction. Preferably, the learning algorithm is separate from the ONE KEYBOARD. At present, there are numerous commercial entities utilizing biometric data. The ONE KEYBOARD is compatible with all of these applications.

Over time, the ONE KEYBOARD and its biometric learning algorithm determine which applications a user uses most of the time. The universal keyboard suggests optimal keyboard layouts, based on the applications used most of the time, which enable a user to decrease his number of keystrokes, and improve his efficiency and experience.

The ONE KEYBOARD comes with a device driver. In addition, there is a small program that allows the user to choose from standard keyboard layouts, or design his own custom layout, using a simple graphical interface. There is an error-correcting program that corrects typing errors, similar to SWIFTKEY®, developed and manufactured by TouchType Limited of London, UK. There is an optional cloud based service that includes better "learning" from the user's experiences, and security systems that ensure that each user matches their biometric security profile.

The ONE KEYBOARD is the most innovative change to human-computer interaction (HCI, http://en.wikipedia.org/wiki/Human%E2%80%93computer_interaction) with desktop and laptop computers in the past decade, and is the it keyboard anyone will ever need to buy.

One having the benefit of the subject disclosure will appreciate that there are many variations of the keyboard of the subject invention. The present invention may be embodied in applications for cellular phones, including inter alia the IPHONE® and IPAD® manufactured by Apple Corporation of Cupertino, Calif., and the ANDROID™ phones manufactured by Samsung Electronics Co., Ltd of Korea, using built-in technology of the phones to collect biometric data.

Furthermore, add-on components to the ONE KEYBOARD device driver make use of the behavioral data collected during operation. These components inter alia detect fatigue and stress, detect mental states and/or moods, and diagnose physical ailments such as arthritis and Parkinson's disease. As such, the ONE KEYBOARD may be used by qualified medical professionals. Alternatively, or additionally, such information may be used to determine when a person may be more likely persuaded by a particular type of advertisement.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A keyboard for cooperation with a keystroke and behavioral biometric analyzer, comprising:
   a blank translucent surface used as an input device;
   a capacitive layer mounted underneath said translucent surface, enabling detection of touch location and touch pressure on said translucent surface;
   a projection system dynamically projecting a visual layout of keys of a keyboard on said translucent surface; and
   a biometric generator, coupled with said capacitive layer, receiving user input in conformance with the projected layout of keys, and generating therefrom a time series history, over a period of time, of touch location, touch timing and touch pressure data, for transmission as a data stream to a keystroke and behavioral biometric analyzer, wherein the time series history of touch timing data comprises a series of times at which keys are depressed and times at which the depressed keys are released, and wherein the time series of touch pressure data comprises a series of pressure magnitudes.

2. The keyboard of claim 1 wherein said projection system is mounted underneath said capacitive layer.

3. The keyboard of claim 1 wherein said projection system comprises a micro-LED array mounted underneath said capacitive layer.

4. The keyboard of claim 1 wherein said projection system comprises a projection bar mounted on the edge of said translucent surface.

5. The keyboard of claim 1 wherein the touch location data comprises, for each of a plurality of times, horizontal and vertical position data, and wherein the touch pressure data comprises, for each of the plurality of times, amounts of pressure applied to keys.

6. The keyboard of claim 1 wherein said projection system dynamically changes the projected layout of keys, in response to user activity.

7. The keyboard of claim 6 wherein said projection system dynamically projects different layouts of keys corresponding to different applications with which the user is currently interacting.

8. The keyboard of claim 7 wherein said projection system changes the layout of keys being projected in response to a user changing the application with which he is currently interacting.

9. The keyboard of claim 7 wherein said projection system projects different layouts of keys corresponding to word processing applications, web browsers and games.

10. The keyboard of claim 1 further comprising an accelerometer measuring small movements in the keyboard induced by a user, and wherein said biometric generator is coupled with said accelerometer and is configured to generate therefrom a time series of acceleration data, for use as data by the keystroke and behavioral biometric analyzer.

11. A method for use by a keyboard in cooperation with a keystroke and behavioral biometric analyzer, comprising:

dynamically projecting a visual layout of keys onto a blank translucent surface;

dynamically sensing touch location and touch pressure on the translucent surface at a sequence of times; and generating therefrom a data stream history, over a period of time, of touch location, touch timing and touch pressure data for transmission to a keystroke and behavioral biometric analyzer, based on the projected visual layout of keys, wherein the data stream history of touch timing data comprises times at which keys are depressed and times at which the depressed keys are released, and wherein the data steam history of touch pressure data comprises pressure magnitudes.

12. The method of claim 11 wherein the touch location data comprises, for each of the plurality of times, horizontal and vertical position data, and wherein the touch pressure data comprises, for each of the plurality of times, amounts of pressure applied to keys.

13. The method of claim 11 further comprising dynamically changing the visual layout of keys that is projected onto the translucent surface, in response to user activity.

14. The method of claim 13 further comprising dynamically projecting different layouts of keys corresponding to different applications with which the user is currently interacting.

15. The method of claim 14 further comprising changing the layout of keys being projected in response to a user changing the application with which he is currently interacting.

16. The method of claim 14 further comprising projecting different layouts of keys corresponding to word processing applications, web browsers and games.

17. The method of claim 11 further comprising:

dynamically sensing small movements in the keyboard induced by a user at a sequence of times; and generating therefrom a data stream of acceleration data for use by the keystroke biometric analyzer.

\* \* \* \* \*